Figure 1:
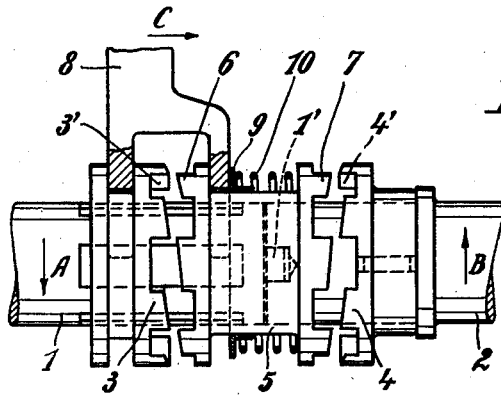

May 9, 1933.  A. GRAF v SODEN-FRAUNHOFEN  1,907,619
CLAW COUPLING
Filed July 10, 1931      2 Sheets-Sheet 1

Inventor:
Alfred Graf v. Soden-Fraunhofen

May 9, 1933.  A. GRAF v SODEN-FRAUNHOFEN  1,907,619
CLAW COUPLING.
Filed July 10, 1931  2 Sheets-Sheet 2
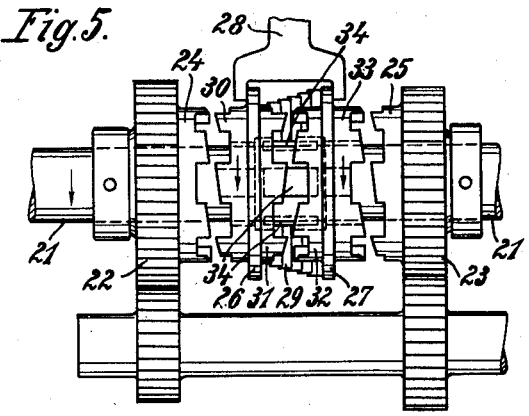
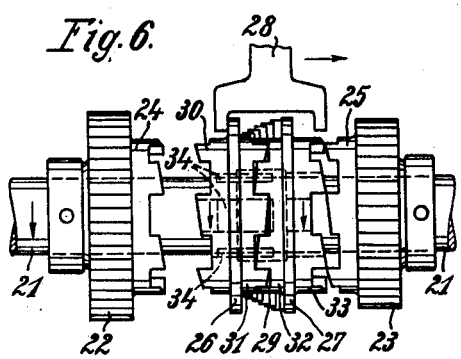 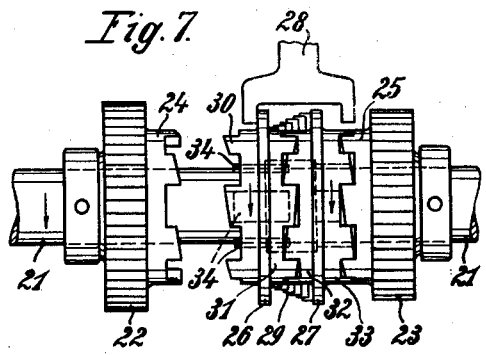
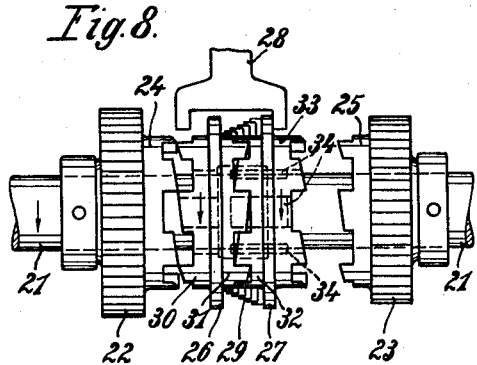 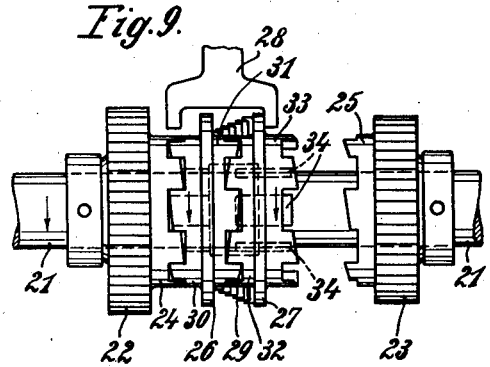
Inventor:
Alfred Graf v. Soden-Fraunhofen Patented May 9, 1933

1,907,619

UNITED STATES PATENT OFFICE

ALFRED GRAF v. SODEN-FRAUNHOFEN, OF FRIEDRICHSHAFEN, GERMANY, ASSIGNOR TO ZAHNRADFABRIK AKTIENGESELLSCHAFT, OF FRIEDRICHSHAFEN, GERMANY

CLAW COUPLING

Application filed July 10, 1931, Serial No. 549,901, and in Germany July 21, 1930.

My invention relates to claw couplings, and especially to couplings of this kind which are provided with teeth having two supporting side faces each and an inclined front face. It is wellknown to provide two rotatable coupling members with such teeth in such manner that the teeth face each other and that at the same time the inclinations of the facing teeth are substantially parallel to each other. In consequence thereof the two coupling members engage immediately when moved towards each other and if the first one of them rotates in a certain direction relative to the other member, but the two members will not engage if the first one of them rotates in the opposite direction relative to the second member. In this latter case the two members will repulse each other until the relative sense of rotation has changed, which means the originally faster rotating member has become the slower one or that the originally slower one becomes the faster one.

Couplings of this kind therefore can be used only for certain cases in which the speed and sense of relative rotation with regard to the two coupling members are predetermined from the beginning so as to prevent sudden engagement which may cause destruction.

My invention improves these conditions so that it becomes possible to bring both coupling members into bodily contact without running the risk of causing such sudden destructive engagement. With my invention both coupling members when approaching each other will always rattle past each other until their relative sense of rotation has changed.

This object I attain by inserting between both coupling members a third co-axial member which has coupling teeth corresponding in shape to the teeth of the main coupling members and having front faces inclined substantially in the same direction as the front faces of the teeth of the respective main coupling member which they face. The intermediate member when being shifted axially but resiliently together with one of the two main members will soon by its teeth on one of its sides come into definite engagement with one of the two main members, then forming one unit with this member, whereas the teeth on its other side will rattle past the teeth of the other main member until the relative direction of rotation with regard to these elements has changed.

The accompanying drawings represent examples embodying my invention.

Figure 2:
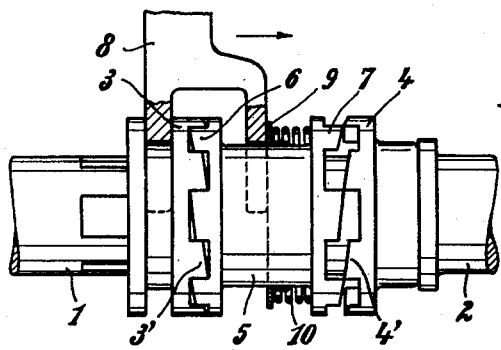
Figure 3:
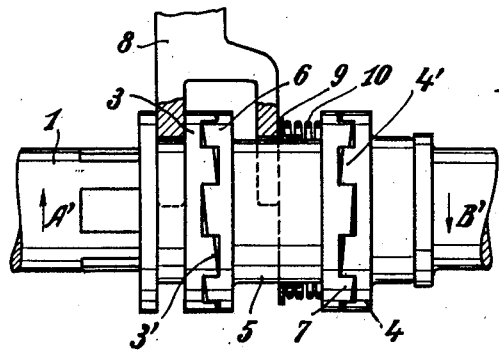
Figure 4:
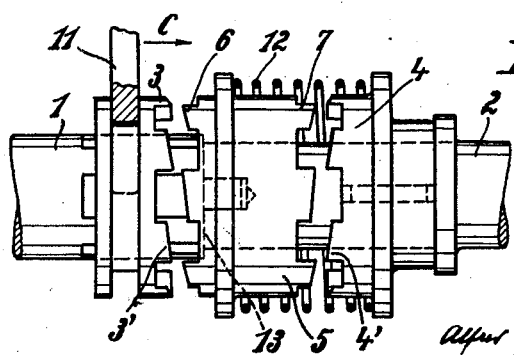

Figs. 1 to 3, inclusive, refer to one example, Fig. 4 represents a second example, and Figs. 5 to 9, inclusive, refer to a third example. All of the figures are plan or side views on shafts provided with couplings according to my invention.

In the first example Fig. 1 shows the idling position, Fig. 2 is the intermediate position, and Fig. 3 shows the coupling parts in final engagement.

Shaft 1 and shaft 2 are arranged co-axially and abut each other. Shaft 2 at its end is provided with a centric recess into which fits a centric projection 1' of shaft 1. There is sleeve 3 splined to shaft 1. Sleeve 4 is rigidly fixed to shaft 2. Sleeve 5 is loosely inserted between sleeve 3 and sleeve 4 and not splined to shaft 1 nor to shaft 2. Sleeve 3 is provided with teeth 3' and sleeve 4 with teeth 4', whereas sleeve 5 has teeth on both ends, 6 and 7. Sleeve 3 has an annular groove into which one forked end of striker rod 8 fits. The other fork of this rod extends into a wide annular groove of sleeve 5. In this latter groove a washer 9 and a spring 10 are also situated.

The relative direction of rotation of shafts 1 and 2, or sleeves 3 and 4, respectively, is indicated by arrows A and B, respectively.

If from the position shown in Fig. 1 striker rod 8 is moved to the right in the direction of arrow C sleeves 3 and 5 both are travelling towards sleeve 4. Because of the inclinations of the teeth and due to the relative direction of rotation the teeth 7 of sleeve 5 are repulsed from teeth 4' of sleeve 4. Spring 10 is compressed by the operating force on striker rod 8, and teeth 3' and 6 come into final engagement. Sleeve 5 because of its friction on sleeve 4 rotates with this sleeve, but of course slower, so that the inclination of teeth 3' and teeth 6 causes them to engage under the axially acting pressure of striker rod 8. This position is shown in Fig. 2.

The teeth 7 and 4' rattle past each other so long as the relative direction of rotation given by arrows A and B, respectively, is prevailing, striker rod 8 constantly tending to move to the right. Shortly after the relative direction of rotation has changed to the opposite, that is to the conditions shown by arrows A' and B' in Fig. 3, final engagement of sleeve 3 with sleeve 5 is caused. The change in the relative direction of rotation may be caused by one of the two shafts slowing down or one of them becoming faster in rotation. There need not be any change in the absolute direction of rotation.

If we assume that from the beginning the relative direction of rotation be opposite to the one shown in Fig. 1, then loose sleeve 5 will first engage with main sleeve 4 and rattle past main sleeve 3. And shortly after the relative direction of rotation has changed, final engagement of all three sleeves will be attained.

Spring 10 serves for separating again sleeve 3 from the engagement with sleeve 5.

The example represented in Fig. 4 is principally the same as the one in Figs. 1, 2 and 3, except that there is no double fork. Only sleeve 3 is moved by fork 11 against the pressure of spring 12, which in this case is inserted between sleeve 4 and sleeve 5. Otherwise the operation and function is exactly as with the design and construction represented in Figs. 1, 2 and 3.

In the example of Figs. 5 to 9, inclusive, the application of my invention to some speed gear is shown. In this case on shaft 21 two gears 22 and 23 are loosely mounted and either one of them is to be connected to the shaft by means of a coupling device according to my invention.

For this purpose the gears 22 and 23 are provided with coupling halves 24 and 25, respectively. There are two sleeves, 26 and 27, on shaft 21. These sleeves can be shifted longitudinally of the shaft by means of double striker rod 28. Between both sleeves spring 29 is inserted which tends to hold the two sleeves apart. Both sleeves at both their sides are provided with coupling halves 30, 31, 32 and 33, respectively. All coupling halves have double supporting teeth with inclined front faces. The inclinations of the front faces facing each other and belonging to one coupling, respectively, are substantially parallel to each other, respectively.

Shaft 21 in the median part of its middle portion between the two gears is provided with splines 34, so that sleeves 26 and 27, when in their middle position are splined to the shaft and rotate with it. But these splines are so short, that one or the other of the two sleeves becomes loose when moved to the right or to the left, respectively, whilst the second or the first one is still splined to the shaft.

Fig. 6 represents the position prevailing after striker rod 28 has been moved to the right. Spring 29 is compressed and coupling halves 31 and 32 were brought to engagement, whereas coupling halves 33 and 25 rattle past each other and prevent final engagement until the relative direction of rotation prevailing between shaft 21 and gear 23 has changed. Shortly after both these parts have come to the same speed of rotation final engagement is reached. Then all the parts are in the position shown in Fig. 7 and gear 23 is finally coupled to shaft 21.

When moved to the left striker rod 28 causes the position represented in Fig. 8 which corresponds to Fig. 6. Now, both sleeves are again coupled but rattle past coupling half 24 of gear 22, and Fig. 9 shows the position of final engagement of gear 22 with shaft 21 after their relative direction of rotation has changed, which happens shortly after the parts intended to come into engagement have attained the same speed of rotation.

Thus, by my invention, it is possible to bring the coupling halves intended to come into engagement into contact without taking any special care. There is no possibility of thereby causing destruction, and the coupling can be operated independently of the speed and direction of rotation prevailing at the moment of operation. The final engagement will not be effected before the parts to be coupled practically rotate in conformity.

I do not want to be limited to the details described or shown in the drawings, as many variations will occur to those skilled in the art.

What I claim is:

1. A claw coupling comprising a first rotatable member and a second rotatable member, co-axial thereto, both said members being provided with claw teeth, said teeth each having two supporting side faces and an inclined front face, the front faces of the teeth of said first member being inclined in the opposite direction than the front faces of the teeth of said second member; a third rotatable member co-axial to said first two members and being loosely inserted therebetween, said third member on both sides being provided with claw teeth which have two supporting side faces and an inclined front face each, the inclination of the teeth facing the first member being substantialy parallel to the inclined front faces of the teeth on said first member, and the inclination of the teeth facing the second member being substantially parallel to the inclined front faces of the teeth on said second member; means for axially shifting one of said first members, and means for axially but resiliently shifting said intermediate third member.

2. A claw coupling comprising a first, a second and a third rotatable member, all said members being arranged co-axially but adapted to rotate independently of each other; a fourth and a fifth rotatable member, also arranged co-axially to said first members but adapted to be shifted axially and for a certain length of their axial way being splined to said first member; said second and said third member each on one side being provided with one claw coupling half, said fourth and said fifth member each on both sides being provided with claw coupling halves; all said claw coupling halves having teeth with two supporting side faces and an inclined front face; said fourth and said fifth member being adapted to be coupled together and to be coupled alternately to said second member or to said third member; the front faces of the coupling teeth of all coupling halves being so inclined that the inclinations with coupling halves facing each other are substantially parallel.

ALFRED GRAF v. SODEN-FRAUNHOFEN.